May 11, 1948.　　　　N. A. KARLIN　　　　2,441,420
CLAMP

Filed Oct. 26, 1944

Inventor:
Nathan A. Karlin,
by Harry E. Dunham
His Attorney.

Patented May 11, 1948

2,441,420

UNITED STATES PATENT OFFICE 2,441,420

CLAMP

Nathan A. Karlin, Bridgeport, Conn., assignor to General Electric Company, a corporation of New York Application October 26, 1944, Serial No. 560,506

6 Claims. (Cl. 24—19)

My invention relates to clamps and more particularly to an improved clamping device for securing devices, such as electric discharge tubes, in operative position in electrical apparatus.

Many clamping devices for the purpose of securing the components of electrical equipment in place when the equipment is subjected to vibration have been devised. It has been difficult to provide a simple clamping device of relatively light weight which insures positive clamping action and which is readily adjustable to accommodate slight differences in the size of the object clamped. Many of the clamps heretofore provided have also been complicated and expensive to manufacture.

It is an important object of the present invention to provide a clamping device which embodies a better balance between cost of manufacture and weight on the one hand and ruggedness and adaptability on the other hand.

In the illustrated embodiment of my invention is shown a clamping device for securing an electric discharge tube in mounted position in a tube socket carried by a supporting plate. The clamp includes a pair of resilient arms which are moved towards one another by cam action produced by the rotation of an operating member which is carried in slidable and nonrotatable relation with respect to an operating shaft extending between the free ends of the opposed arms of the clamping member. The size of the opening defined by the clamp is adjusted by a nut threaded on the operating shaft and which is prevented from rotation by interengaging portions of the operating member and nut which are held together by the resilience of the clamping member. A fastening member or foot is slidably mounted on the operating shaft between the arms of the clamping member to secure the clamp to a support and at the same time to leave both arms of the clamp free to move.

Figure 1:
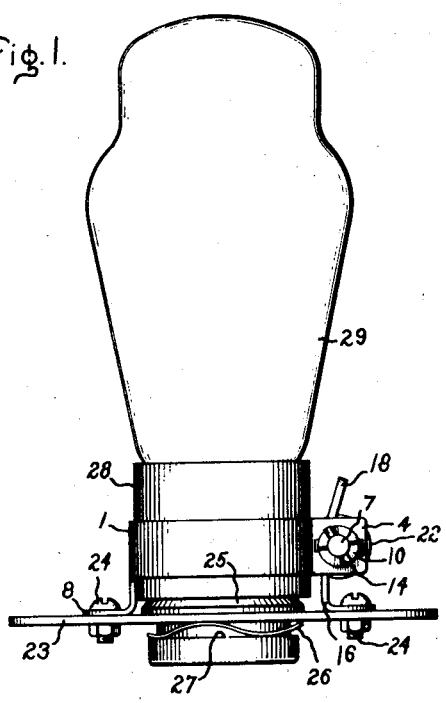
Figure 2:
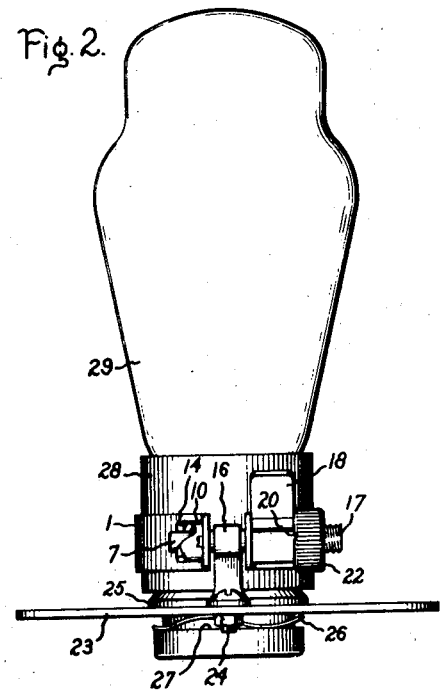
Figure 3:
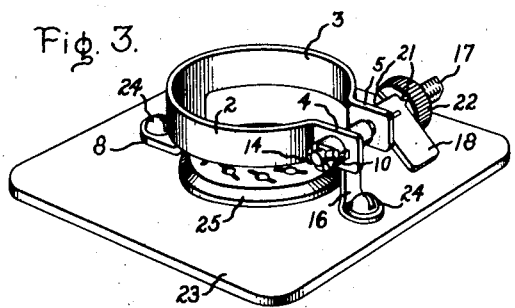
Figure 4:
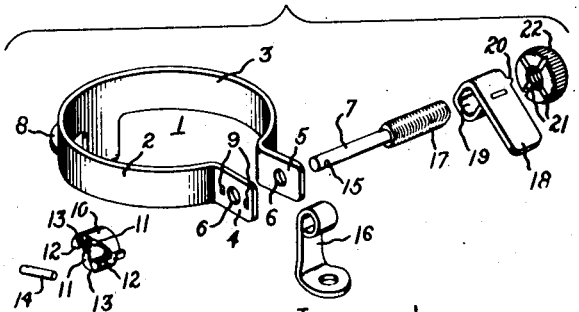

For a better understanding of my invention reference may be had to the following description taken in connection with the accompanying drawing, and its scope will be pointed out in the appended claims. In the drawing, Figs. 1 and 2 are elevational views of a clamp embodying my invention applied to the base of an electric discharge device; Fig. 3 is a perspective view of the clamp illustrated in Figs. 1 and 2 with the discharge device removed, and Fig. 4 is an exploded view in perspective showing the details of construction of the various elements of the clamp.

Referring now to the drawing, the clamp includes a strap 1 having opposed curved arms 2 and 3 terminating at the free ends thereof in parallel flanges 4 and 5. The flanges 4 and 5 are provided with alined openings 6, as shown clearly in Fig. 4, to receive the circular portion of an operating shaft 7. The clamping ring may to advantage be formed as a stamping of resilient sheet metal and be provided with an integral foot 8. As illustrated clearly in Fig. 4, the flange 4 of the clamp is provided with openings 9 located on opposite sides of the opening 6 for the reception of projections formed on a cam element 10. This provides for fastening the cam element to the flange 4 by passing the projections through the openings 9 and staking the projections on the back side of the flange. The cam member 10 includes cam surfaces 11 and two sets of shoulders 12 and 13 which provide means for positively limiting the angular movement of the shaft 7. The cooperating cam surface or cam follower on the operating shaft is provided by a pin 14 which is passed through an opening 15 in the shaft 7 with a fit sufficiently tight to maintain the parts in assembled relation. A movable foot 16 is carried by the circular portion of the shaft 7 between the flanges 4 and 5 of the clamp body to provide an additional means for securing the clamp to the support. Since this foot is free to move along the shaft between the flanges 4 and 5, it in no way interferes with the movement of resilient arms 2 and 3 required for the clamping operation. The operating shaft 7 is provided with an end portion 17 of substantially square cross section on which an operating member 18 is slidably and nonrotatably mounted. As indicated in the drawing, the operating member extends at right angles to the axis of the shaft and is provided with a portion defining a substantially square opening 19 for the reception of the square end of the shaft 7. The operating member 18 is also provided with prongs 20 which are adapted to seat in grooves 21 formed in the face of an adjusting nut 22. The adjusting nut is screwed to the threaded end of the shaft to confine the operating member between the nut and the outside of the flange 5 of the resilient arm 3. It is apparent that the resilience of the arm and the interengaging parts 20 and 21 will prevent rotation of the adjusting nut 22 unless the arm 3 is depressed sufficiently to allow the operating member 18 to be moved away from the adjusting nut.

As illustrated in Figs. 1 to 3, the clamp may be secured to a plate 23 by bolts 24 passing through openings formed in the mounting feet 8 and 16. The clamp is located on the plate so that the openings defined by the resilient arms are substantially concentric with a circular tube socket 25 supported from the plate 23. It will be readily understood that the movable or floating foot 16 will permit a reasonable error in positioning of the clamp relative to the socket without interfering with the clamping action of the resilient arms 2 and 3. As illustrated in Figs. 1 and 2, the socket 25 is secured in position by a resilient washer 26 which engages the lower surface of the plate and a shoulder 27 formed in the socket body. In Figs. 1 and 2 the clamp is shown tightly engaging the circular base portion 28 of an electric discharge device having a glass envelope 29.

From the detailed description of the clamp given above, it is believed that the features and advantages of the present invention will be readily understood. For example, with the clamp in the position shown in Fig. 3 a tube is inserted into the socket 25 and the operating member or thumbpiece 18 is rotated upwardly to the position illustrated in Figs. 1 and 2. This moves the pin 14 on the cam surfaces 11 until they rest against the stops 13. The endwise movement of the operating shaft caused by the lift of the cam draws the resilient arm 3 toward the resilient arm 2 by an amount equal to the lift of the cam. If the clamp is not of the size to give the desired amount of clamping force, the flange 5 is depressed and adjustment made by rotating the adjusting nut 22 after the operating member has been moved towards the resilient arm sufficiently to release the interengaging parts 20 and 21.

It has been found that clamps constructed in accordance with the illustrated embodiment of my invention are relatively light, sturdy, and provide positive clamping action and are also readily adjustable to meet variations in the size of the article to be clamped.

While I have shown and described a particular embodiment of my invention, it will be obvious to those skilled in the art that changes and modifications may be made without departing from my invention in its broader aspects, and I therefore aim in the appended claims to cover all such changes and modifications as fall within the true spirit and scope of my invention.

What I claim as new and desire to secure by Letters Patent of the United States, is:

1. A clamp including a pair of opposed resilient arms, camming means provided in connection with one of said arms near the free end thereof, an operating shaft extending through alined openings formed in said arms and having projections engaging said camming means so that rotation of said shaft causes relative movement between said shaft and said one arm, an operating lever slidably and nonrotatably positioned on said operating shaft adjacent the other of said arms, an adjusting nut threaded on said shaft and engaging said operating arm to position said arm and thereby determine the size of the opening provided by said opposed arms, said nut and said arm being provided with portions which are held in interengaging relation by the action of said resilient arms to prevent movement of said nut without release of said operating member by moving one of said resilient arms.

2. A clamp including a pair of opposed resilient arms, camming means provided on the outer side of one of said arms near the free end thereof, an operating shaft extending through openings formed in said arms and having projections engaging said camming means so that rotation of said shaft causes relative movement between said shaft and said one arm, an operating lever slidably and nonrotatably positioned on said operating shaft, and an adjusting nut threaded on said shaft and engaging said operating arm to position said arm and thereby determine the size of the opening provided by said opposed arms.

3. A clamp including a pair of opposed resilient arms, camming means provided in connection with one of said arms near the free end thereof, an operating shaft extending through alined openings formed in said arms and having projections engaging said camming means so that rotation of said shaft causes relative movement between said shaft and said one arm, an operating lever nonrotatably mounted on said operating shaft adjacent the outside of the other of said arms, and means for determining the position of said lever on said shaft and engaging said operating arm to position said arm to determine the size of the opening provided by said opposed arms.

4. A clamp including a pair of resilient arms, a shaft operatively connected with one of said arms and extending through an opening formed in the other of said arms, an operating member slidably and nonrotatably mounted on said shaft, an adjusting nut threaded on said shaft for confining the movement of said operating member between said nut and the outside of the other of said arms, cooperating means for moving said shaft endwise relative to one of said arms in response to rotation of said operating member and thereby to change the size of the opening defined by said arms, one of said means being fixed on one of said arms and the other rotated by rotation of said operating member.

5. A clamp including a pair of resilient arms, a shaft operatively connected with one of said arms and extending through an opening formed in the other of said arms, an operating member slidably mounted on said shaft and nonrotatable with respect thereto, an adjusting nut threaded on said shaft for confining the movement of said operating member between said nut and the outside of the other of said arms, cooperating means for moving said shaft endwise relative to one of said arms in response to rotation of said operating member and thereby to change the size of the opening defined by said arms, one of said means being fixed on one of said arms and the other rotated by rotation of said operating member and interengaging parts on said nut and said operating member normally held in engagement by the resilience of said arms to prevent undesired rotation of said adjusting nut.

6. A clamp including a pair of resilient arms, means for moving said arms relative to one another to clamp said arms around an object including a threaded shaft and an adjusting nut, and an operating member nonrotatably supported on said shaft and including means for engaging the face of said nut to prevent movement of said nut when the arms of said clamp are engaging an object to be clamped, and means including one of said resilient arms for holding said last mentioned means in engagement with said nut so that said nut may be released by deflection of said arm.

NATHAN A. KARLIN.

REFERENCES CITED

The following references are of record in the file of this patent:

UNITED STATES PATENTS

| Number | Name | Date |
| --- | --- | --- |
| 687,177 | Caldwell | Nov. 19, 1901 |
| 1,203,402 | Post | Oct. 31, 1916 |
| 1,236,929 | Hauck | Aug. 14, 1917 |
| 1,393,811 | Mossholder et al. | Oct. 18, 1921 |
| 2,190,463 | Watt | Feb. 13, 1940 |